Figure 1:
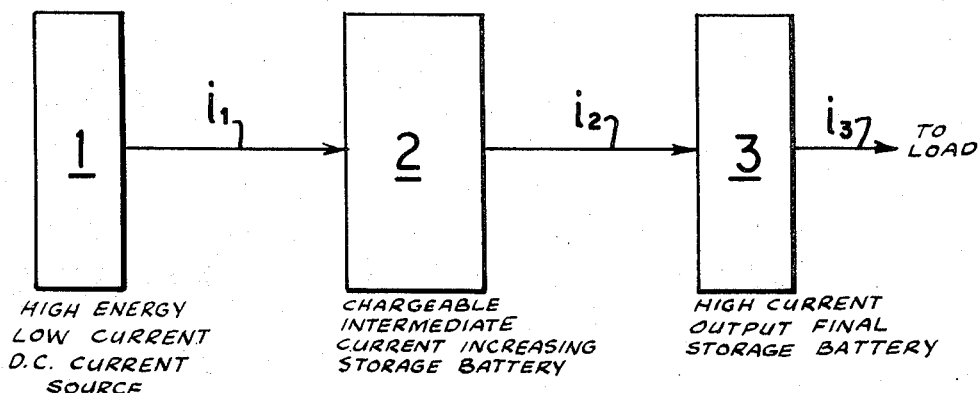

United States Patent [19]
Du Plessix et al.

[11] 3,798,527
[45] Mar. 19, 1974

[54] ELECTROCHEMICAL D.C. CURRENT TRANSFORMER SYSTEM

[75] Inventors: Michel Guy Marie Jochaud Du Plessix, Paris; Yves Jacques Felix Lecouffe, Courbevoie, both of France

[73] Assignee: Societe des Accumulateurs Fixes et de Traction (Societe Anonyme), Romainville, France

[22] Filed: Oct. 18, 1971

[21] Appl. No.: 190,369

Related U.S. Application Data

[63] Continuation of Ser. No. 9,526, Feb. 9, 1970, abandoned.

[30] Foreign Application Priority Data
Feb. 21, 1969  France ............................. 69.04529

[52] U.S. Cl. ............................. 320/6, 320/8, 320/61
[51] Int. Cl. ............................................. H02j 7/00
[58] Field of Search ............. 320/61, 5, 17, 18, 6–8; 307/43; 136/202, 205

[56] References Cited
UNITED STATES PATENTS

| | | | |
|---|---|---|---|
| 3,366,865 | 1/1968 | Shapiro | 320/61 |
| 2,979,551 | 4/1961 | Pack | 320/61 X |
| 3,049,709 | 8/1962 | Rianhard, Jr. | 307/43 X |
| 3,427,524 | 2/1969 | Tobey | 320/61 |
| 3,047,807 | 7/1962 | Langan | 320/5 X |

Primary Examiner—J. D. Miller
Assistant Examiner—Robert J. Hickey
Attorney, Agent, or Firm—Kenyon & Kenyon Reilly Carr & Chapin

[57] ABSTRACT

Increasing of direct current of a given intensity from a primary source of high energy and low power is effected via an intermediate direct current stage to current of higher intermediate intensity which stage delivers the intermediate intensity to a terminal storage battery capable of supplying desired higher intensity. The terminal storage battery is effectively charged by the intermediate direct current stage storage battery and the latter is fully and effectively charged by the primary source.

9 Claims, 3 Drawing Figures

PATENTED MAR 19 1974 3,798,527

INVENTORS
MICHEL G.M. JOCHAUD DU PLESSIX
YVES J.F. LECOUFFE
BY
Kenyon & Kenyon Reilly Carr & Chapin
ATTORNEYS

ELECTROCHEMICAL D.C. CURRENT TRANSFORMER SYSTEM

RELATED APPLICATIONS

This is a continuation, of application Ser. No. 9,526 filed Feb. 9, 1970, now abandoned.

BRIEF SUMMARY OF INVENTION

The present invention relates to an electrochemical direct-current transformer system.

The problem has often arisen in practice, when a high-energy source has been available which has yielded a direct current whose intensity could not depart from certain limits, of changing this direct current into a current of different intensity, for example, of higher intensity supplied at an appropriate voltage, for a limited time.

The simplest system consists of a storage battery to which a charging current at a given intensity is supplied and which can in turn supply a discharge current having a different intensity which may be higher.

However, this current transformation is subject to practical limits.

First of all, the upper limits of the intensity of the output current of the storage battery is set by its total internal resistance, which effect is the result more particularly of the polarization of the electrodes.

In addition, the lower limit of the intensity of the input current to the storage battery is set by the efficiency of the transformation of the electrical energy into potential chemical energy. The yield of this transformation is in fact a function of the input current. The lower the charging input current, the poorer the electrochemical charge yield, that is, the ratio between the quantity of electricity supplied and the quantity of electricity accepted by the electrodes for effecting the corresponding electrochemical transformations. At the limit, the storage battery ceases to be charged when the input current becomes too low. In addition, a limit may be set on the intensity of the input current by operating considerations, for example, in the case of a sealed battery.

It will, therefore, be seen that, in practice, such a system is limited and not readily applicable to needs.

As an example of such a system, there may be cited the case of a terminal storage cell which is intended to transform the current supplied by a primary cell so as to enable the latter to feed an electric shaver. In such example, the daily consumption needed is 240 mA for 6 minutes and it is desired to recharge the storage cell of the shaver during the remainder of its idle time in 24 hours with a current of the order of 1 mA. Now, in such shavers, the small alkaline cell has a rated capacity of 250 mAh which has been envisaged for this application only accepts under these conditions one-quarter of the charge supplied thereto. It will, therefore, be necessary to charge it, not for 24 hours, but for at least 96 hours or for about 15 to 20 hours at 4mA in order to restore its full charge. Such a low yield deprives the apparatus envisaged of all practical interest. Nevertheless, of all the storage cells known at this time, the cell under consideration, which is an alkaline cell having electrodes comprising a thin sintered support, is the one which has the highest current transformation ratio (ratio of the maximum current supplied during the time and at the desired intensity to the minimum charge current at acceptable output). The example clearly shows the difficulties encountered in achieving a current transformation at a high ratio, without being exposed to prohibitive losses.

The present invention has among its object the obviation of these disadvantages.

According to one aspect of the present invention, there is provided an electrochemical direct-current changer stage for changing a direct current of a given intensity from a primary source of high energy and low power, to a direct current of a desired higher intensity, comprising one or several intermediate stages consisting of storage batteries, capable of supplying direct currents of intensities intermediate the given intensity and the desired higher intensity and a terminal storage battery capable of supplying the desired higher intensity and of being fully and effectively charged by the last intermediate stage, whereas the first intermediate stage is capable of being fully and effectively charged by the current from the primary source and each intermediate stage supplies currents at an intensity capable of fully and effectively charging the following stage.

According to another aspect of the present invention there is provided a method of changing a direct current of a given intensity to a direct-current of a desired higher intensity, comprising the steps of feeding the direct current of the given intensity from a primary source to intermediate storage battery means, whereby the current of given intensity is increased into a current of an intensity intermediate the given intensity and the desired higher intensity at the output of the intermediate storage battery means and feeding the direct current of the intermediate intensity to a terminal storage battery, whereby the current of the intermediate intensity is increased into a current of the desired higher intensity for delivery at the output of the terminal storage battery.

The increased then has a number of parameters which may be adapted to meet requirements. It becomes possible to achieve values of several hundreds and even several thousands for the ratio between the output current supplied by the terminal storage battery and the input current supplied by the primary source. It is this adaptation of the parameters which endows the system of this invention with its flexibility.

In accordance with a preferential feature of the invention, one intermediate storage battery comprises a number of storage batteries which are successively charged in rotation by the primary source, the said intermediate storage batteries also being successively discharged in rotation into a succeeding current increasing stage or directly into the terminal battery.

Considering, for example, the case of a current changing system according to the invention which comprises one intermediate stage and the terminal storage battery, the aforesaid arrangement makes it possible, by using in the intermediate stage storage batteries whose capacity is well adapted to be charged by the initial current supplied by the primary source, i.e., relatively low in relation to the desired output current, to obtain the complete charging of the intermediate storage batteries in a shorter time than if this stage comprised only one storage battery because the discharge time of one of the storage batteries of the said intermediate stage may be utilized in the charging of another storage battery of this same stage.

In this way, the primary source can operate continuously, which may be an advantage in some cases.

Moreover, such an arrangement is advantageous because it affords reliability of use, since the intermediate stage can continue to operate in the event of one of its component batteries becoming defective.

It is to be noted that, in accordance with a preferred feature of the method of the invention, the storage batteries of at least the first of the intermediate stages are completely charged, taking into account the usual charge yield, but are not overcharged. This permits higher charging rates where necessary.

In order that the invention may be more readily understood several embodiment of the invention will now be described, by way of example, with reference to FIGS. 1, 2 and 3 of the accompanying drawing which respectively show very diagrammatically three alternative arrangements of construction of an electrochemical direct-current current changing system according to the invention.

In FIG. 1, the references 1, 2 and 3 denote respectively a high-energy low power primary source 1, a single stage intermediate comprising at least one storage battery 2 and a terminal or output storage battery 3.

The high-energy lower power primary source 1 may be chosen notably from the following types: a lithium cell, an air-metal cell, a nuclear or isotopic cell or a generator operated by a windmill or the like.

Advantageously, the terminal or output storage battery 3 and the storage batteries 2 of the intermediate stage each have a very low internal resistance. Thus, alkaline batteries of the cadmium-nickel type having thin sintered plates, for example, of the sealed or semi-sealed type may be employed.

The single intermediate stage 2 is supplied with current $i_1$ of low intensity coming from the primary source 1. The storage battery of the intermediate stage 2 is such that it can be fully and effectively charged with the aid of the current $i_1$. The intermediate stage 2 in turn supplies a charging current $i_2$ to the terminal or output storage battery 3, which is adapted to deliver and supply the desired output current $i_3$. Moreover, current $i_2$ is capable of charging the battery 3 completely and effectively.

There will be given in the following by way of illustration, having no limiting character, an example of the application of the invention by means of which it is possible to provide a current of several hundred amperes from a primary source supplying only a few tenths or hundredths of ampere.

Referring to FIG. 1, the primary source 1 consists of a battery of lithium cells adapted, for example, to supply continuously a current $i_1$ of 82 milliamperes for about 320 hours.

The single intermediate stage 2 which receives the charging current $i_1$ consists of a battery of cadmium-nickel cells having thin sintered plates with a total capacity of about 1.6 ampere-hours, which stage 2 in turn is capable of supplying, for example, a charging current $i_2$ of 1.6 amperes to the terminal storage battery 3.

The terminal storage battery 3 also consists of cadmium-nickel cells having thin sintered plates, with a total capacity of 35 ampere-hours, which is capable of supplying the desired output current $i_3$ of 200 amperes. It will, therefore, be seen that the current $i_1$ of 82 milliamperes corresponds, in the case of the intermediate storage battery stage or means, 2, to a charge thereof at the rate of approximately $C/20$, $C$ being the rated capacity in ampere-hours of the intermediate storage battery means 2, and that the charging current $i_2$ of 1.6 amperes therefrom corresponds, in the case of the battery of terminal accumulators 3, to a charge thereof at the rate of approximately $C/22$. Such charge rates, for the batteries of accumulators under consideration, permits obtaining a substantially complete and, therefore, efficient charging of all.

If it is desired that the terminal storage battery 3 should supply an output current $i_3$ of 200 amperes at 10 volts for a given time, it is possible to choose for this battery cells which have a mean voltage of 1 volt at this rate and during this time, which is the case with the cells known as VO 35 and manufactured by the applicants' assignee. It is then necessary to connect 10 such cells in series to provide battery 3. In order that these 10 cells may be fully charged at $C/22$, it is necessary for each of them to have at the end of the charge a voltage of about 1.42 – 1.45 volts. Consequently, the voltage at the output of the intermediate stage 2 must be of the order of 14.2 to 14.5 V. If it is considered that each cell of the battery 2 forming the intermediate stage in charged state has a mean voltage of 1.18 V, which is the case with VB 200 cells manufactured by the applicants' assignee, which have a capacity of about 1.6 Ah, it is necessary, in order to obtain 14.2 to 14.5 V from stage 2, to connect 13 of these cells in series. In order to be able to charge the latter cells completely at $C/20$, it is necessary for each of them at the end of the charge to have a voltage of 1.45 V. Consequently, the voltage at the output of the primary source must be 18.85 V. Since it may be assumed that a lithium cell supplies a mean voltage of 1.68 volts, which is the case with the Li20 cells also manufactured by the applicants' assignee, it will be necessary to connect 11 of these cells in series in order to obtain 18.85 V for primary source 1.

It will thus be seen from this example that a current of 200 amperes at 10 volts is obtained from the terminal battery 3 by means of the intermediate stage 2 according to the invention from 11 lithium cells connected in series as the primary stage and giving a current of 82 milliamperes at 18.85 V.

Figure 2:
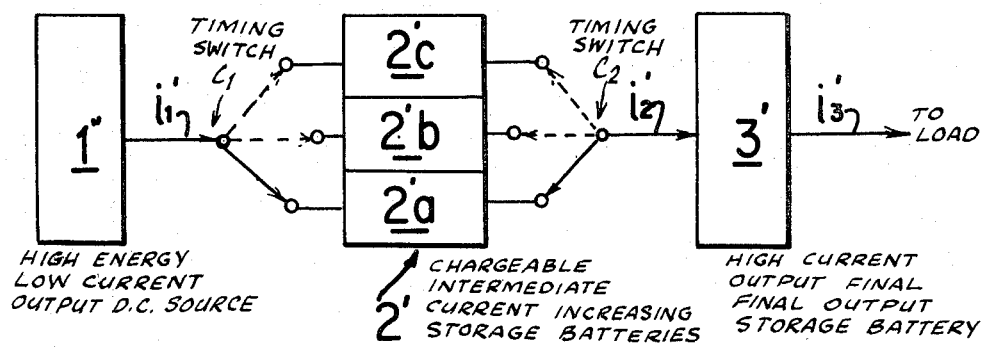

In accordance with a variant of the embodiment just described as seen in FIG. 2, the intermediate stage $2'$ is formed of two or more batteries $2'a$, $2'b$, $2'c$ of 13 VB 200 series connected cells, $2'a$, $2'b$ or $2'c$ being successively charged in rotation as by use of switch $C_1$; the primary battery of lithium cells.

Under these conditions, the lithium cells of primary battery 1 give a continuous output $i_1$ and it will be appreciated that for each battery $2'a$, $2'b$, or $2'c$ of the intermediate stage $2'$ a cycle of 8 hours of charge and 20 minutes of discharge as by a conventional timing switch $C_{22}$ is obtained in the terminal storage battery $3'$ to which a charge of $1.6/3 = 0.53$ ampere-hour is therefore supplied every 8 hours. It will be seen that the latter battery $3'$ will be capable of supplying in this time three pulses, for example, 200 amperes, for 3 seconds.

Figure 3:
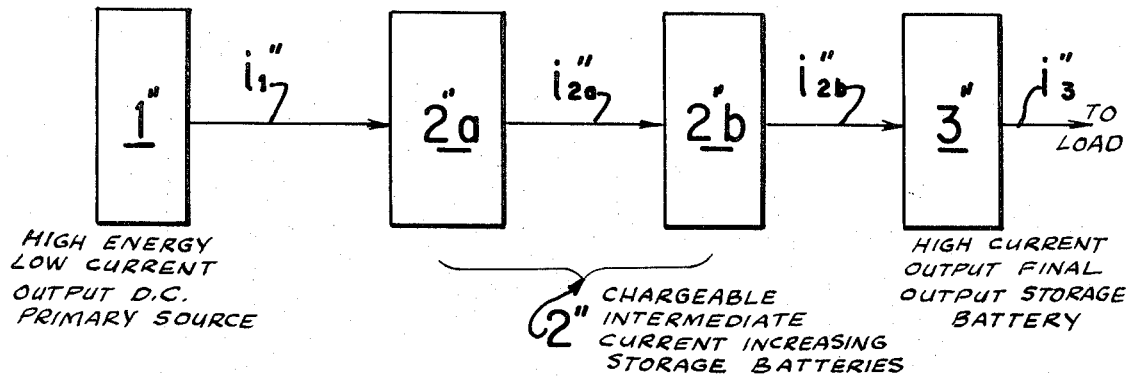

In a further variant seen in FIG. 3, the intermediate stage $2''$ comprises two series connected batteries $2''a$ and $2''b$. The first of these batteries receives charging current $i''_1$ from primary source $1''$ and delivers charging current $i''_{2a}$ of intermediate intensity to battery $2''_b$ which in turn delivers charging current $i2_b''$ to the terminal battery $3''$ which delivers required output circuit $i''_3$. Switches similar to the switches $C_1$ and $C_2$ of FIG.

2 can be used for similar purposes in FIGS. 1 and 2 of alternately connecting respective batteries for change by a preceding battery and for discharge into the following battery.

Finally, it is to be noted that the invention is particularly applicable to isolated systems which are to operate for a relatively long time without any intervention when there are provided in association with a high-energy low power primary source 1 or 1', unserviced storage batteries 2, 3, or 2', 3' such as sealed storage batteries, for example. The lithium cells, of course, may be replaced by any other high-energy and low-power primary source.

Variations within the scope of the appended claims are possible and are contemplated.

What is claimed is:

1. In combination with a primary source of high energy and low power supplying a low current intensity and a chargeable terminal output storage battery of high capacity capable of supplying a direct current output of desired much higher current intensity to a load, a plurality of intermediate electrochemical d. c. current increasing stages each comprising a storage battery of substantially lower capacity than the terminal output storage battery and each being capable of being charged by said low intensity current from said source, means for for connecting the respective batteries of said stages in sequence to said source to be charged sequentially by said current of low intensity from said source, the batteries of said current increasing stages when charged each being capable of supplying a charging direct current of intensity intermediate said current of low intensity of said source and said desired supply of higher intensity from said output battery to a load and capable of charging said output storage battery and switch means for connecting the respective batteries of said current increasing stages in sequence to said terminal output storage battery to charge the latter by a current of said intermediate intensity successively derived from respective batteries of said current increasing stages, the relative ratio of said low current intensity supplied from said source and said desired higher output current intensity being of the order exceeding several hundreds.

2. In the combination of claim 1, each storage battery having low internal resistance.

3. In the combination of claim 2, each storage battery being of the nickel-cadmium type with thin sintered electrode plates.

4. In the combination of claim 3, each storage battery being a sealed type.

5. In the combination of claim 3, each storage battery being a semi-sealed type.

6. In the combination of claim 1, the primary source being an electrochemical storage battery.

7. In the combination of claim 1, the primary source being a windmill operated d. c. generator.

8. A method of changing and amplifying a given initial low intensity direct current output of a primary high energy source to a direct current of a desired higher intensity for delivery to a load comprising the steps of connecting to and successively delivering the given initial direct current of low intensity from said primary high energy source successively to a set of intermediate storage battery means each of relatively low capacity and each being capable of being charged by said low intensity current from said source to charge successively each of said intermediate storage battery means so as to enable supply from each of the said intermediate storage battery means when charged of a current of intensity intermediate the given low current intensity and said desired higher intensity and successively connecting the said intermediate intensity direct current from each of said set as a charging input to a final storage battery of higher capacity than any of the intermediate storage battery means and each being capable of charging said final storage battery to charge said final storage battery means by said current of intermediate intensity from each said intermediate storage battery means so as to enable supply to said load from said final storage battery when charged of an output current of said desired higher intensity, the ratio of initial low intensity current to higher intensity output current being high and the order exceeding several hundreds.

9. In combination according to claim 1, said primary source of higher energy and low power being dischargeable at low current intensity in the range of about 0.82 ma for about 320 hours, and said chargeable terminal output battery of high capacity being capable of periodically supplying a direct current output to a load in the range of about 200 amperes the respective batteries of said current increasing stages each being of substantially lower capacity than said terminal output storage battery and connected in sequence to said source to be charged successively by said current of low intensity, each of the batteries of said stages when charged being capable in sequence of supplying charging direct current to said output battery in the range of 1.6 amperes, an intensity intermediate said low current intensity of said source and said desired 200 ampere periodic supply of higher intensity output current from said output battery to said load, and said storage batteries of said stages being connected by said switch means in sequence when charged to charge successively said higher capacity terminal output storage battery with a current of said intermediate intensity from batteries of successive of said current increasing stages.

* * * * *